(12) United States Patent
Amizur et al.

(10) Patent No.: US 9,226,113 B2
(45) Date of Patent: Dec. 29, 2015

(54) CONSTRAINING INERTIAL NAVIGATION SYSTEM SOLUTION ACCORDING TO PEDOMETRICAL DATA

(75) Inventors: Yuval Amizur, Kfar-Saba (IL); Leor Banin, Petech Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,045

(22) PCT Filed: Dec. 16, 2011

(86) PCT No.: PCT/US2011/065564
§ 371 (c)(1),
(2), (4) Date: Mar. 19, 2014

(87) PCT Pub. No.: WO2013/089783
PCT Pub. Date: Jun. 20, 2013

(65) Prior Publication Data
US 2014/0194138 A1   Jul. 10, 2014

(51) Int. Cl.
*H04W 88/02* (2009.01)
*H04W 4/04* (2009.01)
*G01C 21/16* (2006.01)
*G01C 21/20* (2006.01)
*H04W 4/02* (2009.01)

(52) U.S. Cl.
CPC ............ *H04W 4/043* (2013.01); *G01C 21/165* (2013.01); *G01C 21/206* (2013.01); *H04W 4/02* (2013.01)

(58) Field of Classification Search
CPC .... H04W 4/02; H04W 4/043; A63B 2225/50; G01C 22/006; G01C 21/165; G01C 21/206
See application file for complete search history.

(56) References Cited

U.S. PATENT DOCUMENTS

| 2004/0224718 | A1* | 11/2004 | Chen | 455/553.1 |
| 2009/0043504 | A1* | 2/2009 | Bandyopadhyay et al. | 701/213 |
| 2009/0177437 | A1 | 7/2009 | Roumeliotis | |
| 2009/0265104 | A1* | 10/2009 | Shroff | 701/216 |
| 2011/0119027 | A1* | 5/2011 | Zhu et al. | 702/160 |

FOREIGN PATENT DOCUMENTS

WO   2013/089783 A1   6/2013

OTHER PUBLICATIONS

International Search Report and Written Opinion received for PCT Patent Application No. PCT/US2011/065564, Mailed on Aug. 9, 2012, 9 Pages.
International Preliminary Report on Patentability and Written Opinion received for PCT Patent Application No. PCT/US2011/065564, mailed on Jun. 26, 2014, 10 pages.

* cited by examiner

*Primary Examiner* — Diane Mizrahi
(74) *Attorney, Agent, or Firm* — Forefront IP Lawgroup, PLLC

(57) ABSTRACT

Described herein are techniques related to constraining Inertial Navigation System (INS) solution according to pedometrical data. Data from sensors external to an inertial navigation module are leveraged in computing the final solution for indoor navigation. The techniques render the drift and divergence in inertial sensors to be much slower. Additionally, the techniques are not dependent on the attitude of the mobile device used for indoor navigation relative to the user's body.

31 Claims, 6 Drawing Sheets

CONSTRAINING INERTIAL NAVIGATION SYSTEM SOLUTION ACCORDING TO PEDOMETRICAL DATA

BACKGROUND

As navigation using mobile devices, such as global positioning system (GPS) devices and smartphones equipped with GPS capability, becomes increasingly ubiquitous, the demand for extending this functionality indoors is on the rise. GPS, however, does not work well indoors as the satellite signals tend to be too weak indoors. Presently there exist a number of approaches to provide the indoor navigation functionality.

One approach is to utilize information provided by inertial navigation system (INS) that use low-cost inertial sensors and magnetometers, which are typically embedded in many mobile phones nowadays. Nevertheless, using these sensors to provide an indoor navigation solution tends to be problematic. For example, low-cost microelectromechanical system (MEMS) sensors tend to drift and diverge in a few seconds, resulting in inaccuracy. This alone may be enough reason to explain why such approach is not widely used today.

Another approach is to constrain the navigation results by mounting the sensors on the foot of a user and imposing zero velocity updates to the inertial calculation. However, mounting the sensor on the foot is not practical in many cases, for example when using a handheld device.

Another approach is to use a pedometer, which is an algorithm that count steps and estimate the trajectory according to the step length and the device attitude. However, there are several problems associated with this approach. Firstly, this approach depends very much on the way the user holds the mobile device. There is typically an assumption that the mobile device's attitude relative to the user's body is constant. This assumption renders this approach very limiting and not robust. Secondly, this approach depends on the length of the step of the user, which is unknown. Thirdly, this approach tends not to use most of the accelerometer information.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are techniques, architectures, platforms, devices, framework and methods that constrain INS solution according to external sensor data such as pedometrical data. The techniques leverage data from sensors external to the INS in computing the final solution for indoor navigation. The techniques advantageously render the drift and divergence in inertial sensors to be much slower. Additionally, the techniques are not dependent on the attitude of the mobile device used for indoor navigation relative to the user's body.

For example, sensor data from an accelerometer, a gyroscope and/or a compass may be provided to the INS, or an inertial navigation module, as input. Pedometrical data from a pedometer may also be employed to constrain the INS by Kalman filtering or Bayesian filtering. From the filter a correction to the INS state is applied. The filter output provides a final solution for indoor navigation. Furthermore, data from other external sources, such as Wi-Fi ranges and/or global navigation satellite system (GNSS) pseudo ranges, may also be used in arriving at the final solution.

Example Framework

Figure 1:
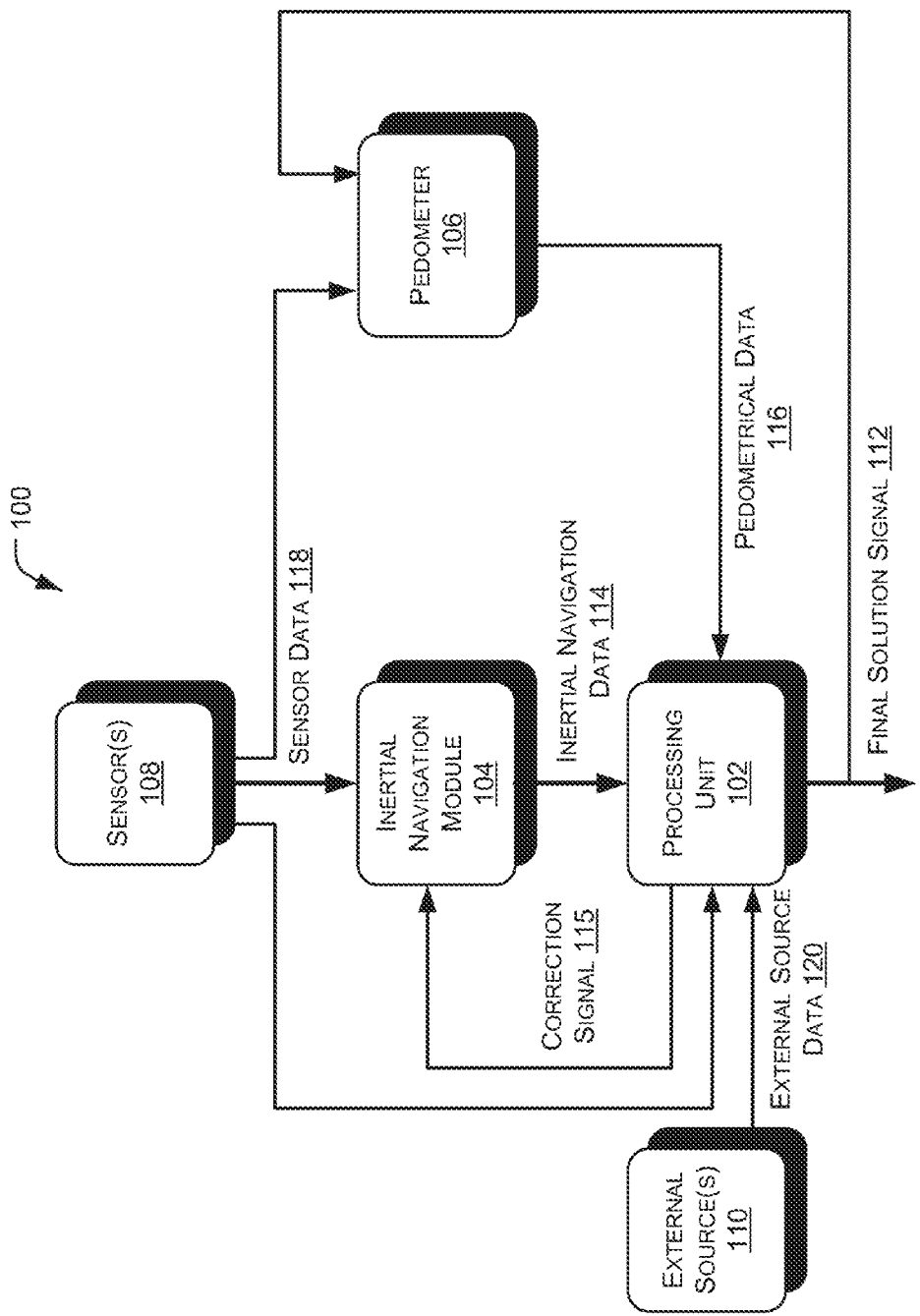
FIG. 1 is a block diagram illustrating an example framework implementing techniques of constraining inertial navigation system (INS) solution according to pedometrical data in accordance with the present disclosure.

FIG. 1 illustrates an example framework 100 that implements techniques of constraining INS solution according to pedometrical data in accordance with the present disclosure.

As shown in FIG. 1, the framework 100 includes a processing unit 102, an inertial navigation module 104, a pedometer 106, one or more sensors 108, and one or more external sources 110. The inertial navigation module 104 is coupled to the processing unit 102 and outputs a first signal, representative of inertial navigation data 114, to the processing unit 102. In addition to the first signal from the inertial navigation module 104, the processing unit 102 receives one or more additional inputs. The processing unit 102 may receive pedometrical data 116 from the pedometer 106. Additionally or alternatively, the processing unit 102 may receive sensor data 118 from the one or more other sensors 108 such as, for example, an accelerometer, a gyroscope and/or a compass, or a combination thereof. Additionally or alternatively, the processing unit 102 may receive external source data 120 from the one or more external sources 110, and the external source data 120 may be, for example, one or more ranges from a Wi-Fi system, one or more GNSS pseudo ranges from a GNSS, data related to a map or layout of a building, or a combination thereof. That is, the one or more additional inputs received by the processing unit 102 may come from the pedometer 106, the one or more sensors 108 or the one or more external sources 110, or a combination thereof. Based on the one or more additional inputs, the processing unit 102 constrains the inertial navigation data 114 from the inertial navigation module 104 and generates a final solution signal 112. In some embodiments, the processing unit 112 further generates a correction signal 115. The final solution signal 112 may be representative of the location, attitude, motion, velocity, acceleration and/or direction of a user, and is used for the purpose of indoor navigation for the user. The correction signal 115 is provided as an input to the inertial navigation module 104. In some embodiments, the corrected signal 114 is different from the final solution signal 112. In some embodiments, the corrected signal 114 is the same as the final solution signal 112.

In some embodiments, the processing unit 102 provides the final solution signal 112 to the pedometer 106 as input to the pedometer 106 such that the pedometer 106 outputs a second signal representative of the pedometrical data 116. Upon receiving the pedometrical data 116, the processing unit 102 may update the final solution signal 112. The processing unit 112 may further generate the correction signal 115 using the inertial navigation data 114 of the first signal and the pedometrical data 116 of the second signal.

In some embodiments, the processing unit 102 includes a Kalman filter. More specifically, the processing unit 102 may include the software, middleware, firmware, hardware, or a combination thereof that implements the functionality of a Kalman filter. In some embodiments, the processing unit 102 includes a Bayesian filter. More specifically, the processing unit 102 may include the software, middleware, firmware, hardware, or a combination thereof that implements the functionality of a Bayesian filter. In other embodiments, the processing unit 102 includes a suitable filter that filters the inertial navigation data 114 of the first signal and the data of the one or more inputs, such as the pedometrical data 116, the sensor data 118 and the external source data 120, to generate the final solution signal 112.

In some embodiments, the inertial navigation module 104 may utilize one or more motion equations to generate the first signal representative of the inertial navigation data 114. For example, the inertial navigation module 104 may utilize motion equations for an Earth-Centered, Earth-Fixed (ECEF) coordinate system, such as those shown below.

$$C_b^e(+) \approx C_b^e(-) \cdot (I_3 + \Omega_{ib}^b \cdot \tau_i) - \Omega_{ie}^e \cdot C_b^e(-) \cdot \tau_i \quad \text{Equation 1}$$

$$v_{eb}^e(+) \approx v_{eb}^e(-) + \overline{(f_{ib}^e + g_b^e - 2 \cdot \Omega_{ie}^e \cdot v_{eb}^e(-))} \cdot \tau_i \quad \text{Equation 2}$$

$$r_{eb}^e(+) \approx r_{eb}^e(-) + (v_{eb}^e(+) + v_{eb}^e(-)) \cdot \tau_i / 2 \quad \text{Equation 3}$$

In the above motion equations, (−) refers to the old value, (+) refers to the new calculated value, $C_b^e$ is the rotation matrix between body frame and the ECEF frame, $I_3$ is a standard 3-by-3 diagonal matrix, $\Omega_{ie}^e$ Is the skew-symmetric matrix of the earth angular velocity, $\tau$ is the time between updates, $v_{eb}^e$ is the velocity between body and the ECEF frame, $f_{ib}^b$ is the specific force measured by the accelerometer, $\Omega_{ib}^b$ is the angular rate measured by the gyroscope, $g_b^e$ is the gravitation of the earth, and $r_{eb}^e$ is the distance between body and the ECEF frame and is also the position vector.

In some embodiments, the inertial navigation module 104 receives the sensor data 118 from the one or more sensors 108 as input. Using the sensor data 118, the inertial navigation module 104 generates the first signal that represents the inertial navigation data 114. In embodiments where the inertial navigation module 104 also receives as input the correction signal 115 from the processing unit 102, the inertial navigation module 104 generates the first signal using the correction signal 115 and the sensor data 118.

In some embodiments, the pedometer 106 receives the sensor data 118 from the one or more sensors 108 as input. Using the sensor data 118, the pedometer 106 generates the second signal that represents the pedometrical data 116. In embodiments where the pedometer 106 receives as input the final solution signal 112 from the processing unit 102, the pedometer 106 generates the second signal using the final solution signal 112. In embodiments where the pedometer 106 also receives as input the final solution signal 112 from the processing unit 102 and the sensor data 118 from the one or more sensors 108, the pedometer 106 generates the second signal using the final solution signal 112 and the sensor data 118.

Example Mobile Devices

Figure 2C:
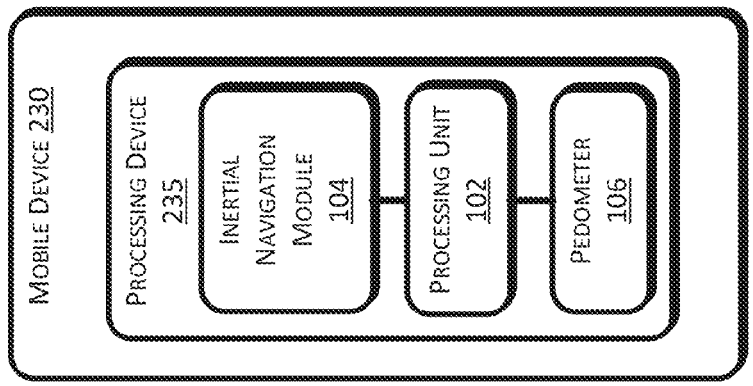
FIGS. 2A-2C are each a block diagram illustrating an example mobile device implementing techniques of constraining INS solution according to pedometrical data in accordance with the present disclosure.
Figure 2B:
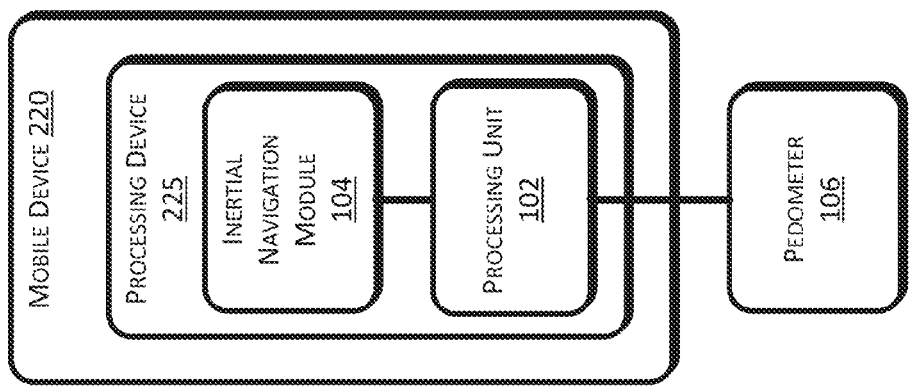
Figure 2A:
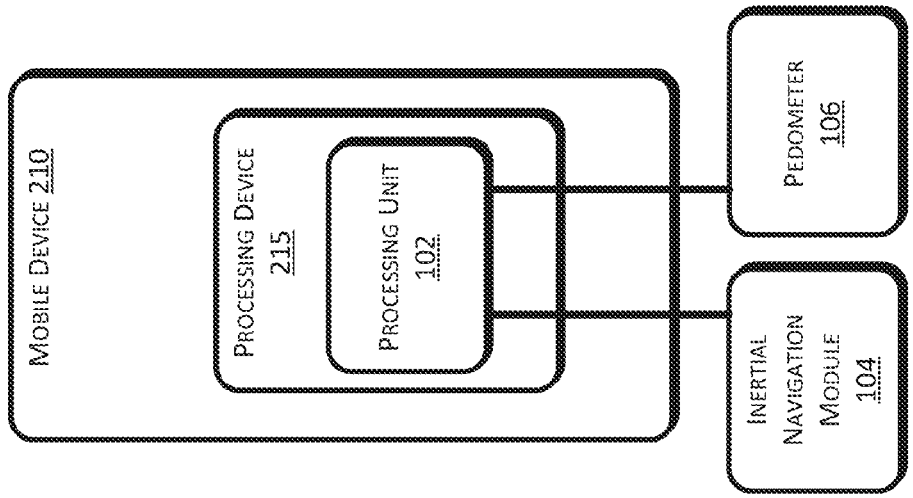

FIGS. 2A-2C each illustrates an example of implementing the framework 100 with respect to a mobile device 210, 220 or 230, respectively. Each of the mobile devices 210, 220 and 230 may be, for example, a portable electronic device, a handheld device, a personal digital assistant, a smartphone or a portable computing device such as a tablet computer, a notebook computer, or a laptop computer.

As shown in FIG. 2A, the processing unit 102 is part of the mobile device 210 while the inertial navigation module 104 and the pedometer 106 are external to the mobile device 210. The processing unit 102 may be implemented in the form of firmware, hardware, a combination thereof, or a combination with software or middleware f. For example, the processing unit 102 may be implemented as a standalone integrated circuit (IC) or chip or, alternatively as shown in FIG. 2A, as part of a processing device 215 which may include a chip, a chipset or a printed circuit board (PCB).

As shown in FIG. 2B, the processing unit 102 and the inertial navigation module 104 are part of the mobile device 220 while the pedometer 106 is external to the mobile device 220. Each of the processing unit 102 and the inertial navigation module 104 may be implemented in the form of firmware, hardware, a combination thereof, or a combination with software or middleware. For example, the processing unit 102 and the inertial navigation module 104 may be integral parts of a chip or may each be implemented in a separate chip. Alternatively, as shown in FIG. 2B, the processing unit 102 and the inertial navigation module 104 may be part of a processing device 225, which may include a chip, a chipset or a PCB.

As shown in FIG. 2C, the processing unit 102, the inertial navigation module 104 and the pedometer 106 are part of the mobile device 230. Each of the processing unit 102, the inertial navigation module 104 and the pedometer 106 may be implemented in the form of firmware, hardware, a combination thereof, or a combination with software or middleware. For example, the processing unit 102, the inertial navigation module 104 and the pedometer 106 may be integral parts of a chip or may each be implemented in a separate chip. Alternatively, as shown in FIG. 2C, the processing unit 102, the inertial navigation module 104 and the pedometer 106 may be part of a processing device 235, which may include a chip, a chipset or a PCB.

Example Processes

Figure 3:
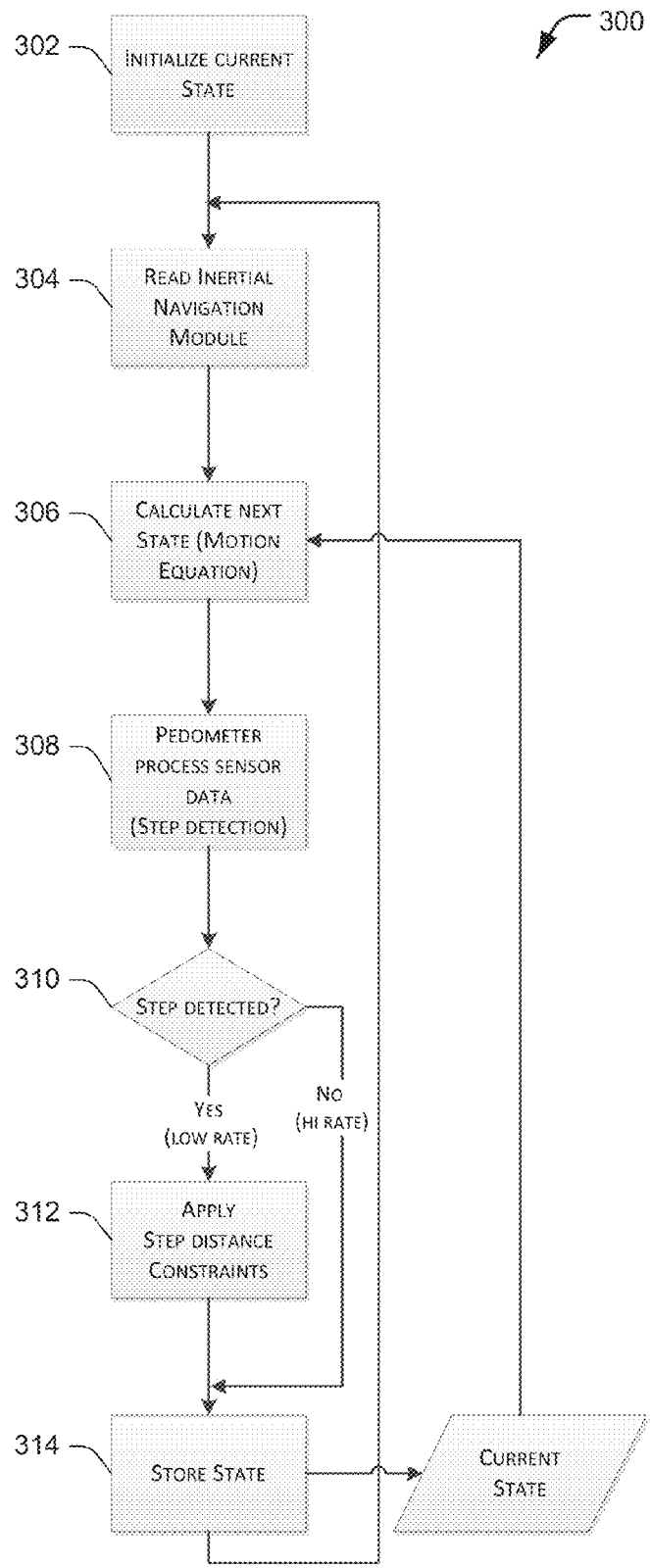
FIG. 3 is a flow chart illustrating an implementation of constraining INS solution according to pedometrical data in accordance with the present disclosure.
Figure 4:
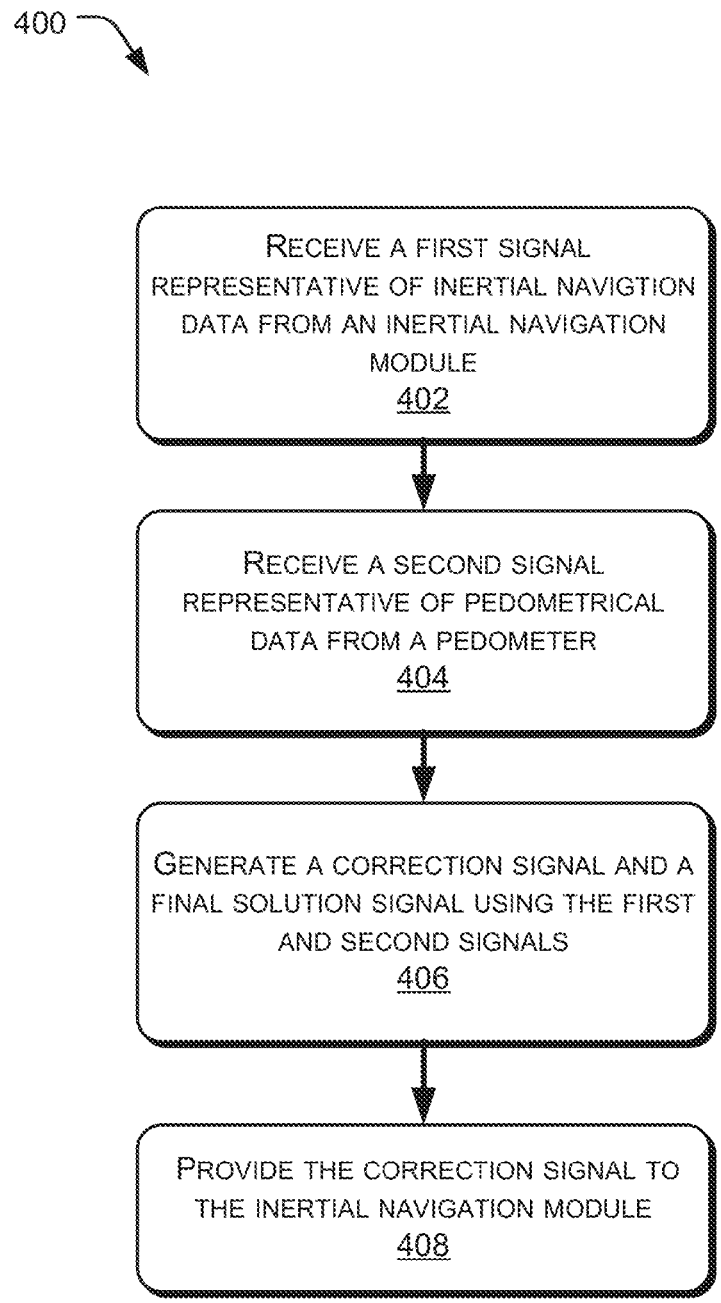
FIG. 4 is a flow chart illustrating an example method for constraining INS solution according to pedometrical data in accordance with the present disclosure.
Figure 5:
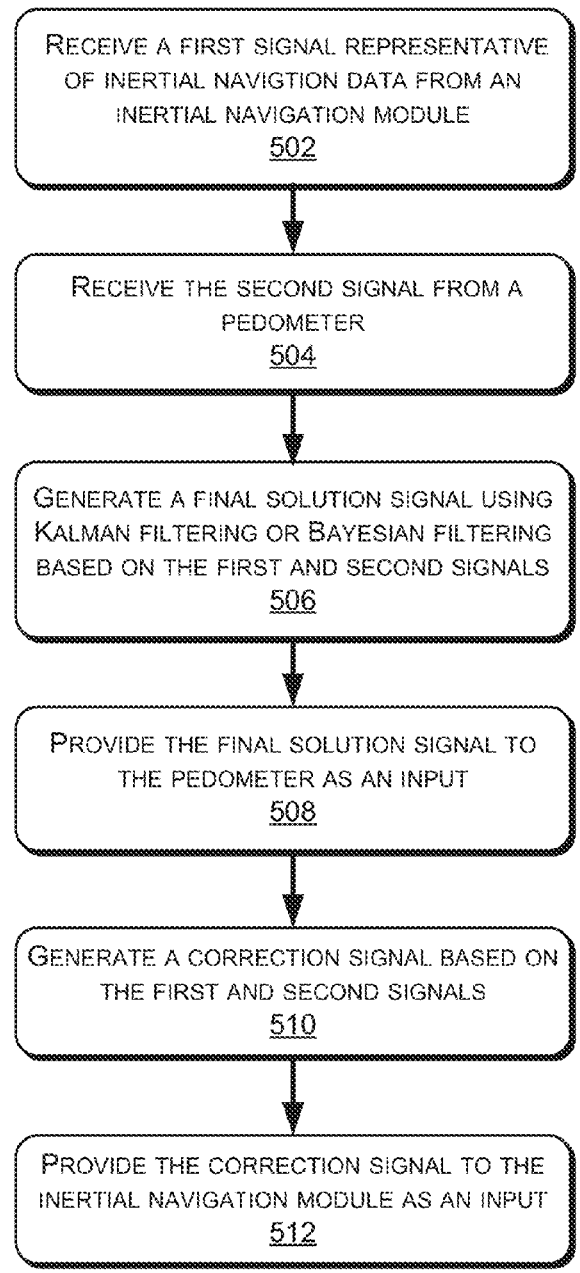
FIG. 5 is a flow chart illustrating another example method for constraining INS solution according to pedometrical data in accordance with the present disclosure.

FIGS. 3, 4 and 5 are flow diagrams illustrating example processes 300, 400 and 500 that implement the techniques described herein for constraining INS solution according to pedometrical data. The order in which the process operations of example processes 300, 400 and 500 is described is not intended to be construed as a limitation, and any number of the described process operations may be combined in any order to implement the process, or alternate process. Additionally, individual operations may be deleted from the process without departing from the spirit and scope of the subject matter described herein. Furthermore, the process may be implemented in any suitable hardware, software, firmware, or a combination thereof, without departing from the scope of the present disclosure.

FIG. 3 illustrates a process 300 for constraining INS solution according to pedometrical data in accordance with the present disclosure. The process 300 is performed, at least in part, by the processing unit 102, the inertial navigation module 104, and the pedometer 106 as described above.

The process 300 begins at operation 302, where one or more values representative of a current state are initialized to that of an initial state. For example, the one or more values may indicate location, position, direction, velocity, acceleration, or a combination thereof, and such values are initialized, e.g., set to zero or a defined value. As the process 300 progresses, the one or more values are modified relative to their initial values at the initial state.

At operation 304, an output signal of an inertial navigation module is read. For example, the inertial navigation module 104 reads the one or more sensors 108 by receiving as input the sensor data 118.

At operation 306, one or more values representative of a next state are calculated for state estimation. For example, the inertial navigation module 104 may calculate the one or more values for the next state by using motion equations.

At operation 308, a pedometer processes sensor data or state estimation done in operation 306. For example, the pedometer 106 may process inertial sensor readings as part of the sensor data 118 received from the one or more sensors 108. Alternatively, the pedometer 106 may process the final solution signal 112, which represents state estimation.

At operation 310, steps taken by a user are detected to identify a pattern. Once a pattern is identified, the pedometer outputs an indication for each step, e.g., once every many iterations of the process 300. For example, when the pedometer 106 identifies a pattern of steps of a user, the pedometer 106 may output the second signal representative of pedometrical data 116, e.g., a distance between two consecutive steps, as an input to the processing unit 102.

At operation 312, step distance constraints are applied to INS solution of the inertial navigation module. In other words, when the step indication is output by the pedometer, step distance/length estimation is used to update the one or more values of the current state by constraining the possible solution set. For example, the processing unit 102 applies the pedometrical data 116 as constraints to the inertial navigation data 114 received from the inertial navigation module 104. This may be performed by Kalman filtering or Bayesian filtering, for example.

At operation 314, the one or more values representative of the current state are stored. For example, the one or more values representative of the current state may be stored in the inertial navigation module 104.

The process 300 reiterates and starts from operation 304. The one or more values representative of the current state are used in state estimation as performed in operation 306 by; for example, the inertial navigation module 104.

FIG. 4 illustrates the example process 400 for constraining INS solution according to pedometrical data. The process 400 is performed, at least in part, by the processing unit 102 as described above.

The process 400 begins with operation 402, where a first signal representative of inertial navigation data is received from an inertial navigation module. For example, as shown in FIG. 1, the processing unit 102 receives the first signal representative of inertial navigation data 114 from the inertial navigation module 104.

At operation 404, a second signal representative of pedometrical data is received from a pedometer. For example, as shown in FIG. 1, the processing unit 102 receives the second signal representative of pedometrical data 116 from the pedometer 106.

At operation 406, a correction signal and a final solution signal are generated using the first and second signals. For example, as shown in FIG. 1, the processing unit 102 generates and outputs the correction signal 115 and the final solution signal 112 using the first signal representative of the inertial navigation data 114 and the second signal representative of the pedometrical data 116.

The process 400 may optionally execute an additional operation 408. At operation 408, the correction signal is provided to the inertial navigation module. For example, as shown in FIG. 1, the processing unit 102 provides the correction signal 115 to the inertial navigation module 104 as an input to the inertial navigation module 104.

In some embodiments, the process 400 may further include receiving sensor data from a gyroscope, an accelerometer or a compass, or a combination thereof at the pedometer as input to the pedometer. For example, as shown in FIG. 1, the processing unit 102 also receives the sensor data 118 from the one or more sensors 108 that may include one or more of a gyroscope, an accelerometer, and a compass.

In some embodiments, the process 400 may further include providing the final solution signal to the pedometer as input to the pedometer. For example, as shown in FIG. 1, the processing unit 102 generates and outputs the final solution signal 112, which is provided to the pedometer 106 as an input.

In some embodiments, the process 400 may further include receiving sensor data from a gyroscope, an accelerometer or a compass, or a combination thereof at the inertial navigation module as input to the inertial navigation module. For example, as shown in FIG. 1, the inertial navigation module 104 receives the sensor data 118 from the one or more sensors 108 as input.

In some embodiments, the process 400 may further include receiving external source data from one or more external sources. The correction signal and the final solution signal may be generated using the first signal, the second signal, and the external source data. For example, as shown in FIG. 1, the processing unit 102 receives the external source data 120 from the one or more external sources 110, and generates and outputs the correction signal 115 and the final solution signal 112. The external source data may include one or more GNSS pseudo ranges, one or more Wi-Fi ranges, data related to a map or layout of a building, or a combination thereof.

In some embodiments, the process 400 may further include receiving sensor data from a gyroscope, an accelerometer or a compass, or a combination thereof. The correction signal and the final solution signal may be generated using the first signal, the second signal, and the sensor data. For example, as shown in FIG. 1, the processing unit 102 receives the first signal representative of inertial navigation data 114 form the inertial navigation module 104, the second signal representative of pedometrical data 116 from the pedometer 106, and the sensor data 118 from the one or more sensors 108 to generate and output the correction signal 115 and the final solution signal 112.

In some embodiments, the processing unit 102 includes circuitry or logic that performs Kalman filtering, and the first signal representative of inertial navigation data 114 is filtered by Kalman filtering using the second signal representative of pedometrical data 116, to provide the correction signal 115 and the final solution signal 112.

In some embodiments, the processing unit 102 includes circuitry or logic that performs Bayesian filtering, and the first signal representative of inertial navigation data 114 is filtered by Bayesian filtering using the second signal representative of pedometrical data 116, to provide the correction signal 115 and the final solution signal 112.

FIG. 5 illustrates the example process 500 for constraining INS solution according to pedometrical data. The process 500 is performed, at least in part, by the processing unit 102 as described above.

The process 500 begins with operation 502, where a first signal representative of inertial navigation data is received from an inertial navigation module. For example, as shown in FIG. 1, the processing unit 102 receives the first signal representative of inertial navigation data 114 from the inertial navigation module 104.

At operation 504, a second signal representative of pedometrical data is received from a pedometer. For example, as shown in FIG. 1, the processing unit 102 receives the second signal representative of pedometrical data 116 from the pedometer 106.

At operation 506, a final solution signal is generated using Kalman filtering or Bayesian filtering based on the first signal and the second signal. For example, the processing unit 102 may include circuitry or logic that performs Kalman filtering or Bayesian filtering, and the processing unit 102 generates and outputs the final solution signal 112 using Kalman filtering or Bayesian filtering based on the first signal representative of inertial navigation data 114 received from the inertial navigation module 104 and the second signal representative of pedometrical data 116 received from the pedometer 106.

At operation 508, the final solution signal is provided to the pedometer as input such that the pedometer outputs the second signal representative of pedometrical data. For example, as shown in FIG. 1, the pedometer 106 receives the final solution signal 112 as an input and outputs the second signal representative pedometrical data 116.

The process 500 may optionally execute additional operations 510 and 512. At operation 510, a correction signal is generated based on the first and second signals. For example, the processing unit 102 generates the correction signal 115 based on the first signal representative of inertial navigation data 114 and the second signal representative of pedometrical data 116. At operation 512, the correction signal is provided to the inertial navigation module as an input. For example, as shown in FIG. 1, the processing unit 102 provides the correction signal 115 to the inertial navigation module 104 as an input to the inertial navigation module 104.

In some embodiments, the process 500 may further include receiving sensor data from a gyroscope, an accelerometer or a compass, or a combination thereof at the pedometer as input to the pedometer. For example, as shown in FIG. 1, the pedometer 106 receives the sensor data 118 from the one or more sensors 108 as input.

In some embodiments, the process 500 may further include receiving external source data from one or more external sources. The correction signal and the final solution signal may be generated using the first signal, the second signal, and the external source data. For example, as shown in FIG. 1, the processing unit 102 also receives the external source data 120 from the one or more external sources 110 in addition to receiving the first signal and the second signal, and generates and outputs the correction signal 115 and the final solution signal 112. The external source data may include one or more GNSS pseudo ranges, one or more Wi-Fi ranges, data related to a map or layout of a building, or a combination thereof.

In some embodiments, the process 500 may further include receiving sensor data from a gyroscope, an accelerometer or a compass, or a combination thereof. The final solution signal may be generated using the first signal and the sensor data. For example, as shown in FIG. 1, the processing unit 102 also receives the sensor data 118 from the one or more sensors 108 in addition to receiving the first signal and the second signal, and generates and outputs the correction signal 115 and the final solution signal 112.

Example Mobile Devices

Figure 6:
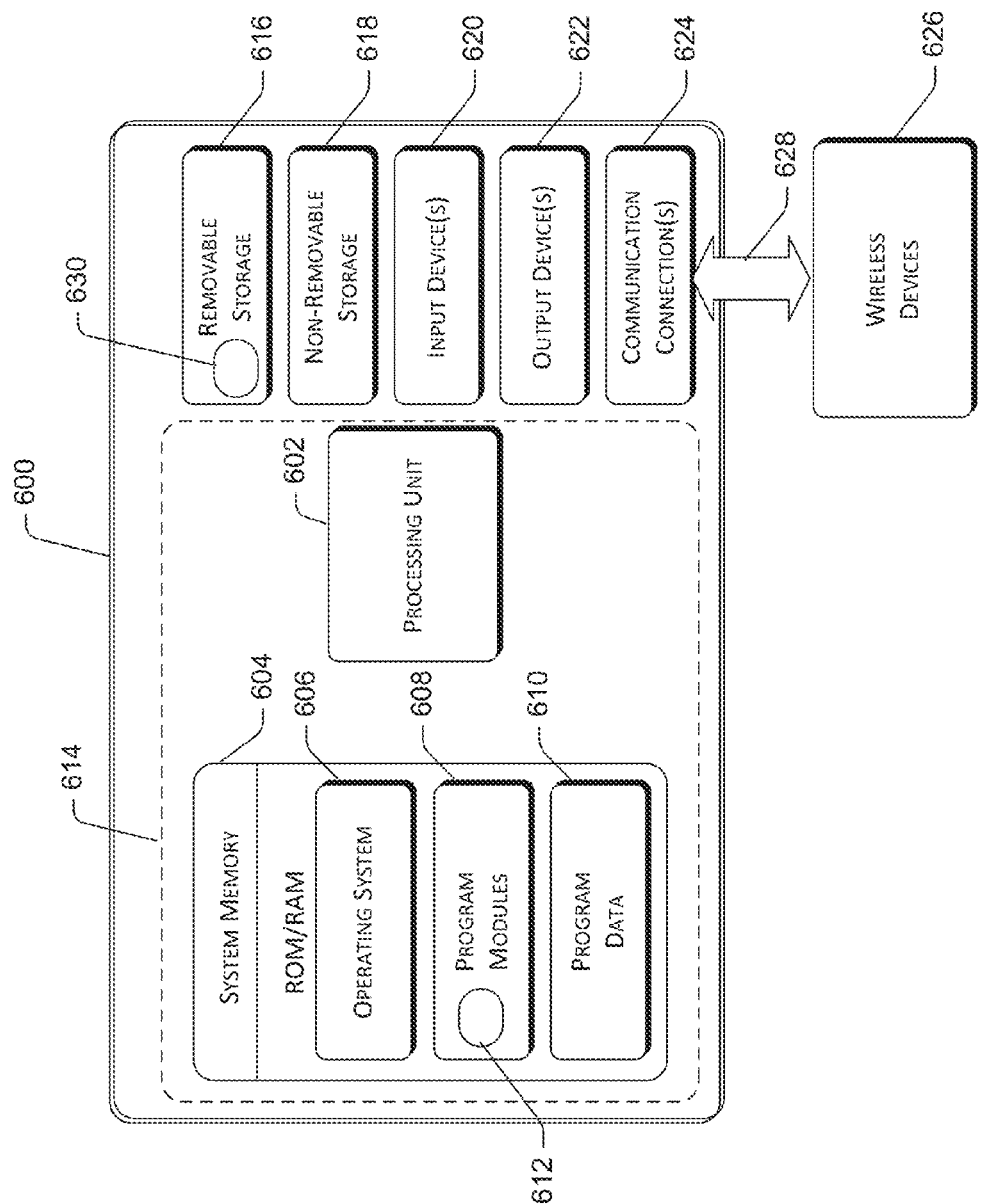
FIG. 6 is a block diagram illustrating an example-computing device that implements techniques of constraining INS solution according to pedometrical data in accordance with the present disclosure.

FIG. 6 illustrates an example computing device 600 that implements the scheme of constraining INS solution according to pedometrical data. However, it will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614.

The program module 608 may include a module 612 configured to implement the one-tap connection and synchronization scheme as described above. For example, the module 612 may carry out one or more of the method 400 and method 400, and variations thereof, e.g., the computing device 600 acting as described above with respect to the processing unit 102, mobile device 210, mobile device 220 or mobile device 230.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 600, mobile device 210, mobile device 220 and mobile device 230. Any of such computer accessible media may be part of the computing device 600.

In one implementation, the removable storage 616, which is a computer accessible medium, has a set of instructions 630 stored thereon. When executed by the processing unit 602, the set of instructions 630 cause the processing unit 602 to execute operations, tasks, functions and/or methods as described above, including method 300, method 400 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate wirelessly with one or more other wireless devices, over wireless connection 628 based on near field communication (NFC), Wi-Fi, Bluetooth, radio frequency (RE), infrared, or a combination thereof.

It is appreciated that the illustrated computing device 600 is one example of a suitable device and is not intended to suggest any limitation as to the scope of use or functionality of the various embodiments described.

Additional and Alternative Implementation Notes

Unless the context indicates otherwise, the term "INS" as used herein includes inertial sensors, magnetometers, MEMS or any suitable means that may output information useful for inertial navigation purposes.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, middleware and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" and "computer accessible media" include computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A method comprising:
   receiving, by a processing unit of a processing device of a mobile device, a first signal representative of inertial navigation data from an inertial navigation module, wherein the inertial navigation module utilizes one or more sensors physically located with a user;
   receiving, by the processing unit of the processing device of the mobile device, a second signal representative of pedometrical data from a pedometer, wherein the pedometer utilizes the one or more sensors physically located with the user;
   generating, by the processing unit of the processing device of the mobile device, a correction signal using the first and second signals; and
   generating, by the processing unit of the processing device of the mobile device, a final solution signal by Kalman filtering or Bayesian filtering the first and second signals.

2. A method as recited in claim 1, wherein the first signal representative of inertial navigation data is generated by the inertial navigation module using one or more motion equations, and wherein generating the correction signal and the final solution signal using the first and second signals comprises Kalman filtering the first and second signals to provide the correction signal and the final solution signal.

3. A method as recited in claim 1, wherein the first signal representative of inertial navigation data is generated by, the inertial navigation module using one or more motion equations, and wherein generating the correction signal and the final solution signal using the first and second signals comprises Bayesian filtering the first and second signals to provide the correction signal and the final solution signal.

4. A method as recited in claim 1 further comprising: providing the correction signal to the inertial navigation module as input to the inertial navigation module such that the inertial navigation module outputs the first signal based at least in part on the correction signal.

5. A method as recited in claim 1 further comprising: receiving sensor data from a gyroscope, an accelerometer or a compass, or a combination thereof at the pedometer as input to the pedometer.

6. A method as recited in claim 1 further comprising: providing the final solution signal to the pedometer as input to the pedometer such that the pedometer outputs the second signal based at least in part on the final solution signal.

7. A method as recited in claim 1 further comprising: receiving sensor data from a gyroscope, an accelerometer or a compass, or a combination thereof at the inertial navigation module as input to the inertial navigation module.

8. A method as recited in claim 1 further comprising: receiving external source data from one or more external sources, wherein generating the correction signal and the final solution signal using the first and second signals comprises generating the correction signal and the final solution signal using the first signal, the second signal, and the external source data.

9. A method as recited in claim 8, wherein the external source data from the one or more external sources comprise one or more global navigation satellite system (GNSS) pseudo ranges, one or more Wi-Fi ranges, data related to a map, or a combination thereof.

10. A method as recited in claim 1 further comprising: receiving sensor data from a gyroscope, an accelerometer or a compass, or a combination thereof, wherein generating the correction signal and the final solution signal using the first and second signals comprises generating the correction signal and the final solution signal using the first signal, the second signal, and the sensor data.

11. A method comprising:
receiving, by a processing unit of a processing device of a mobile device, a first signal representative of inertial navigation data from an inertial navigation module, wherein the inertial navigation module utilizes one or more sensors physically located with a user;
receiving, by the processing unit of the processing device of the mobile device, a second signal representative of pedometrical data from a pedometer, wherein the pedometer utilizes the one or more sensors physically located with the user; satellite system (GNSS) pseudo ranges, one or more Wi-Fi ranges, data related to a map, or a combination thereof.

12. A method as recited in claim 11 further comprising: generating a correction signal based on the first and second signals; and providing the correction signal to the inertial navigation module as input to the inertial navigation module such that the inertial navigation module outputs the first signal based at least in part on the correction signal.

13. A method as recited in claim 11 further comprising: receiving sensor data from a gyroscope, an accelerometer or a compass, or a combination thereof at the pedometer as input to the pedometer.

14. A method as recited in claim 11 further comprising: receiving sensor data from a gyroscope, an accelerometer or a compass, a combination thereof at the inertial navigation module as input to the inertial navigation module.

15. A method as recited in claim 11 further comprising: receiving external source data from one or more external sources, wherein generating the correction signal and the final solution signal using the first and second signals comprises generating the correction signal and the final solution signal using the first signal, the second signal, and the external source data.

16. A method as recited in claim 15, wherein the external source data from the one or more external sources comprise one or more global navigation satellite system (GNSS) pseudo ranges, one or more Wi-Fi ranges, data related to a map, or a combination thereof.

17. A method as recited in claim 11 further comprising: receiving sensor data from a gyroscope, an accelerometer or a compass, or a combination thereof, wherein generating the final solution signal using the first signal comprises generating the final solution signal using the first signal and the sensor data.

18. A device comprising:
an inertial navigation module that outputs a first signal representative of inertial navigation data, wherein the inertial navigation module utilizes one or more sensors physically located with a user; and
a processing unit of a processing device of the device, the processing unit being coupled to receive the first signal and at least a second signal representative of pedometrical data, the processing unit further configured to generate a final solution signal by Kalman filtering or Bayesian filtering the first and second signals and a correction signal using the first signal and the second signal, the correction signal received by the inertial navigation module as an input signal.

19. A device as recited in claim 18, wherein the processing unit comprises a Kalman filter.

20. A device as recited in claim 18, wherein the processing unit comprises a Bayesian filter.

21. A device as recited in claim 18, wherein the processing unit further receives external source data from one or more external sources and generates the final solution signal and the correction signal using the first signal, the second signal, and the external source data.

22. A device as recited in claim 21, wherein the external source data from the one or more external sources comprise one or more global navigation satellite system (GNSS) pseudo ranges, one or more Wi-Fi ranges, data related to a map, or a combination thereof.

23. A device as recited in claim 18, wherein the processing unit further receives sensor data from a gyroscope, an accelerometer or a compass, or a combination thereof and generates the final solution signal and the correction signal using the first signal, the second signal, and the sensor data.

24. A device as recited in claim 18, wherein the inertial navigation module outputs the first signal using one or more motion equations.

25. A device as recited in claim 18, wherein the inertial navigation module further receives sensor data from a gyroscope, an accelerometer, a compass, or a combination thereof and generates the first signal using the correction signal and the sensor data.

26. A device as recited in claim 18 further comprising: a pedometer that outputs pedometrical data as the second signal.

27. A device as recited in claim 26, wherein the pedometer receives sensor data from a gyroscope, an accelerometer or a compass, or a combination thereof and generates the second signal using the using the sensor data.

28. A device as recited in claim 26, wherein the pedometer receives the final solution signal as an input signal and generates the second signal using the final solution signal.

29. At least one computer accessible medium having stored thereon a set of instructions that, when executed by one or more processors, direct the one or more processors to execute operations comprising: receiving a first signal representative of inertial navigation data from an inertial navigation module; receiving a second signal representative of pedometrical data from a pedometer; filtering the first and second signals through a Kalman filter or a Bayesian filter to provide a correction signal and a final solution signal; and providing the correction signal to the inertial navigation module as input to the inertial navigation module such that the inertial navigation module outputs the first signal based at least in part on the correction signal.

30. At least one computer accessible medium as recited in claim 29, wherein the operations further comprise: receiving external source data from one or more external sources, wherein the filtering comprises filtering the first signal, the second signal, and the external source data, and wherein the external source data from the one or more external sources comprise one or more global navigation satellite system (GNSS) pseudo ranges, one or more Wi-Fi ranges, data related to a map, or a combination thereof.

31. At least one computer accessible medium as recited in claim 29, wherein the operations further comprise: receiving sensor data from a gyroscope, an accelerometer or a compass, or a combination thereof, wherein the filtering comprises filtering the first signal, the second signal, and the sensor data.

\* \* \* \* \*